United States Patent
Lukac

(10) Patent No.: US 8,849,057 B2
(45) Date of Patent: Sep. 30, 2014

(54) METHODS FOR DIGITAL IMAGE SHARPENING WITH NOISE AMPLIFICATION AVOIDANCE

(75) Inventor: Rastislav Lukac, San Jose, CA (US)

(73) Assignee: Foveon, Inc., Santa Clara, CA (US)

(*) Notice: Subject to any disclaimer, the term of this patent is extended or adjusted under 35 U.S.C. 154(b) by 320 days.

(21) Appl. No.: 13/465,694

(22) Filed: May 7, 2012

(65) Prior Publication Data

US 2012/0294548 A1 Nov. 22, 2012

Related U.S. Application Data

(60) Provisional application No. 61/487,964, filed on May 19, 2011.

(51) Int. Cl.
*G06K 9/40* (2006.01)
*G06T 5/00* (2006.01)

(52) U.S. Cl.
CPC ....... *G06T 5/004* (2013.01); *G06T 2207/10004* (2013.01)
USPC ......................................................... 382/263

(58) Field of Classification Search
None
See application file for complete search history.

(56) References Cited

U.S. PATENT DOCUMENTS

| | | | | |
|---|---|---|---|---|
| 5,038,388 A | * | 8/1991 | Song | 382/266 |
| 5,054,100 A | * | 10/1991 | Tai | 382/300 |
| 6,268,933 B1 | * | 7/2001 | Kim | 358/1.9 |
| 6,285,798 B1 | * | 9/2001 | Lee | 382/260 |
| 7,146,059 B1 | * | 12/2006 | Durand et al. | 382/260 |
| 7,852,327 B2 | * | 12/2010 | Chen et al. | 345/204 |
| 8,175,411 B2 | * | 5/2012 | Segall | 382/275 |
| 8,478,064 B2 | * | 7/2013 | Kass | 382/264 |
| 8,600,188 B2 | * | 12/2013 | Segall | 382/260 |
| 2001/0041018 A1 | * | 11/2001 | Sonoda | 382/275 |
| 2002/0110282 A1 | * | 8/2002 | Kraft et al. | 382/261 |
| 2003/0016306 A1 | * | 1/2003 | Ogata et al. | 348/671 |
| 2005/0089239 A1 | * | 4/2005 | Brajovic | 382/266 |
| 2006/0227249 A1 | * | 10/2006 | Chen et al. | 348/631 |
| 2007/0009171 A1 | * | 1/2007 | Nakashizuka et al. | 382/263 |
| 2009/0034864 A1 | * | 2/2009 | Kisilev et al. | 382/260 |
| 2009/0079836 A1 | * | 3/2009 | Mishima et al. | 348/208.4 |
| 2009/0220169 A1 | * | 9/2009 | Bennett et al. | 382/268 |
| 2010/0014777 A1 | * | 1/2010 | Bruton et al. | 382/275 |
| 2010/0022878 A1 | * | 1/2010 | Azuma et al. | 600/443 |
| 2010/0040302 A1 | * | 2/2010 | Su et al. | 382/261 |
| 2010/0239173 A1 | * | 9/2010 | Yamada et al. | 382/199 |
| 2010/0254590 A1 | * | 10/2010 | Ramm et al. | 382/133 |
| 2011/0229046 A1 | * | 9/2011 | Muto | 382/233 |
| 2012/0062797 A1 | * | 3/2012 | Segall | 348/606 |
| 2012/0147225 A1 | * | 6/2012 | Ishiga | 348/242 |
| 2012/0294525 A1 | * | 11/2012 | Lukac | 382/167 |

OTHER PUBLICATIONS

Russ in focus Magazine Issue Dec. 20, 2010 "Extending the Unsharp Mask Image Processing Filter" pp. 6-17.*

* cited by examiner

*Primary Examiner* — Sean Motsinger
(74) *Attorney, Agent, or Firm* — The Webb Law Firm

(57) ABSTRACT

A method for sharpening an original digital image includes generating a smoothed image from the original image. A residual image is generated from the smoothed image and the original image. A sharpened smoothed image is generated. The residual image and the sharpened smoothed image are combined to produce a sharpened version of the original image.

17 Claims, 1 Drawing Sheet

METHODS FOR DIGITAL IMAGE SHARPENING WITH NOISE AMPLIFICATION AVOIDANCE

CROSS-REFERENCE TO RELATED APPLICATIONS

This application claims the benefit of U.S. Provisional Patent Application Ser. No. 61/487,964, filed May 19, 2011, the entirety of which is incorporated by reference herein.

BACKGROUND

1. Field of the Invention

The present invention relates to processing of digital images. More particularly, the present invention relates to methods for digital image sharpening while avoiding noise amplification.

2. The Prior Art

Digital images often lack edge sharpness, for example, due to out of focus or insufficient optical capabilities of imaging devices. To increase image sharpness, digital imaging systems and software allow for image sharpening. At the pixel level, the sharpening operation enhances the local contrast between the pixel under consideration and its neighbors.

Unfortunately, digital images usually contain noise introduced to the image during its acquisition and the traditional image sharpening solutions can significantly amplify the level of the noise, thus reducing both the value and practical usability of the image. To reduce this side-effect while enhancing the edges in a digital image, existing sharpening solutions usually rely on the following approach. Noise is first suppressed via denoising prior to applying the sharpening method to the image. Unfortunately, resulting images often lack details and natural appearance and may also suffer from some blur effects and amplification of the noise left after denoising. Therefore, a different solution is needed, at least when it comes to high-quality digital imaging.

BRIEF DESCRIPTION

An advanced method for sharpening a digital image without noise amplification and with double control of detail and edge enhancement is disclosed. The method of the present invention first creates a smoothed version of the original image. Once the smoothed version of the original image is created, these two images are used to produce a residual image, obtained, for example, as the ratio between the original image and its smoothed version or the difference between the original image and its smoothed version. Once the residual image is calculated, the sharpening method is applied to the smoothed image. To produce the sharpened version of the original image, the residual image and the sharpened version of the smoothed image are combined. If the residual signal has been created as the ratio between the original image and its smoothed version, the residual image and the sharpened version of the smoothed image are multiplied. If the residual signal has been created as the difference between the original image and its smoothed version, the residual image is simply added to the sharpened version of the smoothed image.

Other features, utilities and advantages of the various embodiments of the invention will be apparent from the following more particular description of embodiments of the invention as illustrated in the accompanying drawings.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

The method of the present invention provides separation of noise from the signal, sharpening the noise-free image, and restoring the detail information. The disclosed method also provides flexibility. The method of the present invention also provides the ability to avoid noise amplification during image sharpening with double control of detail and controlling the level of edge enhancement.

Figure 1:
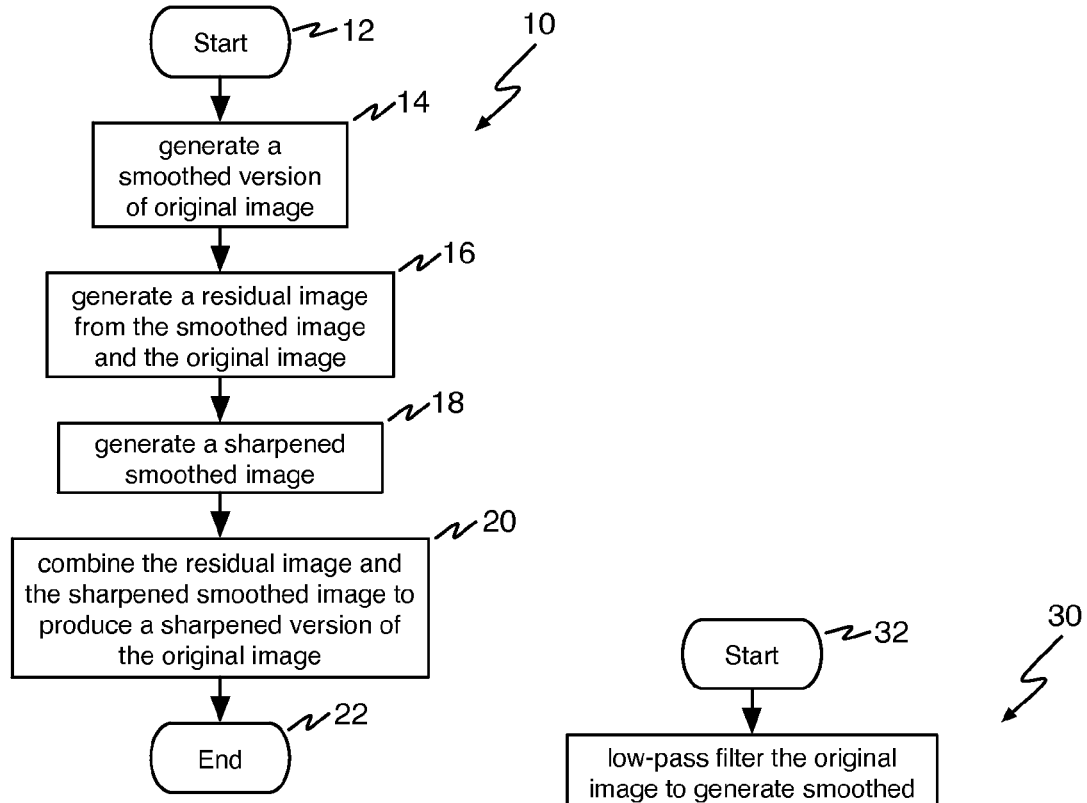
FIG. 1 is a flow chart showing an illustrative example of a method for sharpening a digital image without noise amplification according to the present invention.

Referring first to FIG. 1, a flow diagram shows an illustrative embodiment of a method 10 according to the present invention. The method of the present invention starts at reference numeral 12 and then first creates a smoothed version of the original image as shown at reference numeral 14.

Once the smoothed version of the original image is created, these two images are used to produce a residual image as shown at reference numeral 16. In one example, the residual image is obtained as the ratio between the original image and its smoothed version. In another example, the residual image is obtained as the difference between the original image and its smoothed version. Alternatively, the residual image can be obtained as the ratio between the smoothed version of the original image and the original image, or as the difference between the smoothed version of the original image and the original image. Thus, the residual image contains all the information, such as edges, fine details and noise, removed from the original image by the smoothing procedure.

Once the residual image is calculated, the method proceeds to reference numeral 18 where a sharpening method is applied to the smoothed image. Examples of the sharpening methods include unsharp masking, Laplacian filtering, and sharpening order-statistic filters. However, it should be noted that the proposed framework admits an arbitrary sharpening method. The sharpening procedure enhances edges in the smoothed image and creates the sharpened version of the smoothed image. Since the noise and fine details have been suppressed if not removed altogether in the image smoothing step, the sharpening process does not amplify the noise.

To produce the sharpened version of the original image, the method proceeds to reference numeral 20 where the residual image and the sharpened version of the smoothed image are combined. If the residual signal has been created as the ratio between the original image and its smoothed version, the residual image and the sharpened version of the smoothed image are multiplied. If the residual signal has been created as the difference between the original image and its smoothed version, the residual image is simply added to the sharpened version of the smoothed image. Alternatively, the sharpened version of the original image can be produced by subtracting the residual image from the sharpened version of the smoothed image for the residual image obtained as the difference between the smoothed version of the original image and the original image, or by dividing the sharpened version of the smoothed image with the residual image for the residual image obtained as the ratio between the smoothed version of the original image and the original image. The process ends at reference numeral 22.

The level of details in the final image can be controlled by tuning the strength of the residual signal prior to combining the sharpened version of the smoothed image and the residual image. Parameter values smaller than one result in detail suppression, whereas the values larger than one produce additional edge and detail enhancement. In one example, the difference residual image is multiplied with a predetermined parameter to produce the final residual image. In another example, the final residual image is obtained as a function of this predetermined parameter and the rational residual image. For instance, for positive values of the difference between the rational residual image and one, the residual image values reduced by one can be just multiplied with the parameter value and then added to one. In the case of the negative values of the difference between the rational residual image and one, the inverse residual image values reduced by one are multiplied with the parameter value and then added to one to produce the inverse value of the final residual image.

Figure 2:
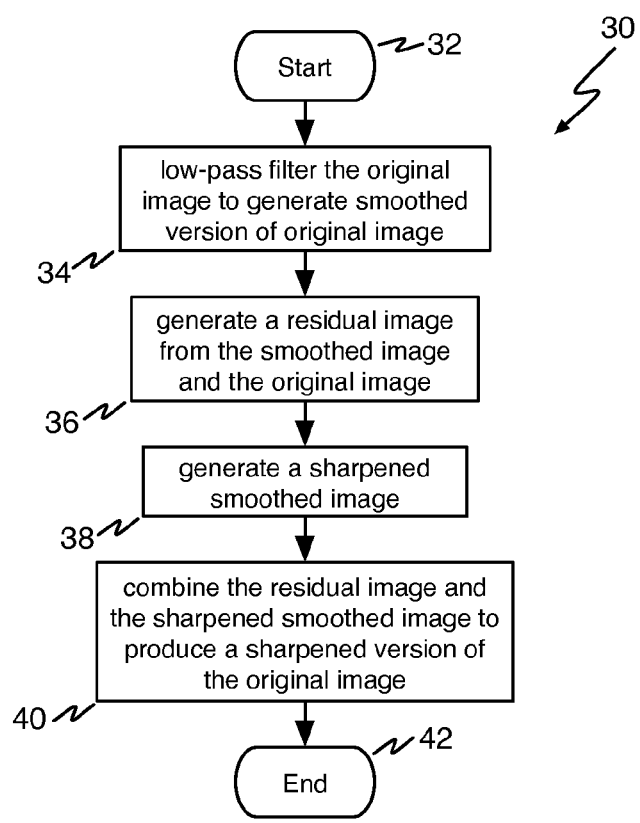
FIG. 2 is a flow chart showing another illustrative example of a method for sharpening a digital image without noise amplification according to the present invention.

Referring now to FIG. 2, a flow diagram shows another illustrative embodiment of a method 30 according to the present invention. The method 30 starts at reference numeral 32 and then first creates a smoothed version of the original image by applying low-pass filtering technique(s) to the original image as shown at reference numeral 34. Examples of such low-pass filtering techniques include various resizing methods such as bilinear and bicubic interpolation which, typically, can be first used to downsample an image and then to upsample a dowsampled image in order to produce a smoothed image with dimensions identical to that of the original image. An alternative way is to use one or more image smoothing methods, such as various spatial averaging, median, and wavelet-based filters. It is also possible to combine resizing and smoothing operations, for example, by performing first downsampling, then image smoothing, and then upsampling.

Once the smoothed version of the original image is created, these two images are used to produce a residual image as shown at reference numeral 36. In one example, the residual image is obtained as the ratio between the original image and its smoothed version. In another example, the residual image is obtained as the difference between the original image and its smoothed version. Alternatively, the residual image can be obtained as the ratio between the smoothed version of the original image and the original image, or as the difference between the smoothed version of the original image and the original image. Thus, the residual image contains all the information, such as edges, fine details and noise, removed from the original image by the smoothing procedure.

Once the residual image is calculated, the method proceeds to reference numeral 38 where a sharpening method is applied to the smoothed image. Non-exhaustive examples of sharpening methods include unsharp masking, Laplacian filtering, and sharpening order-statistic filters. However, persons of ordinary skill in the art will appreciate that the proposed framework admits an arbitrary sharpening method. The sharpening procedure enhances edges in the smoothed image and creates the sharpened version of the smoothed image. Since the noise and fine details have been suppressed if not removed altogether in the image smoothing step, the sharpening process does not amplify the noise.

To produce the sharpened version of the original image, the method proceeds to reference numeral 40 where the residual image and the sharpened version of the smoothed image are combined. If the residual signal has been created as the ratio between the original image and its smoothed version, the residual image and the sharpened version of the smoothed image are combined by multiplication. If the residual signal has been created as the difference between the original image and its smoothed version, the residual image is simply added to the sharpened version of the smoothed image. Alternatively, the sharpened version of the original image can be produced by subtracting the residual image from the sharpened version of the smoothed image for the residual image obtained as the difference between the smoothed version of the original image and the original image, or by dividing the sharpened version of the smoothed image with the residual image for the residual image obtained as the ratio between the smoothed version of the original image and the original image. The process ends at reference numeral 42.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for sharpening an original digital image comprising:
generating a smoothed image from the original image;
generating a residual image from the smoothed image and the original image by generating the ratio between the original image and the smoothed image, then for positive values of the difference between the rational residual image and one, multiplying the difference between the residual image values and one by a factor and adding the product to one, and for negative values of the difference between the rational residual image and one, multiplying the difference between the inverse residual image values and one by the factor, adding the product to one and dividing one by the sum;
generating a sharpened smoothed image; and
combining the residual image and the sharpened smoothed image to produce a sharpened version of the original image.

2. The method of claim 1 wherein generating a smoothed image comprises low-pass filtering the original image.

3. The method of claim 2 wherein generating a smoothed image comprises resizing the original image by downsampling the original image and then upsampling the downsampled image.

4. The method of claim 3 wherein resizing the original image by downsampling the original image and then upsampling the downsampled image comprises using one of bilinear and bicubic interpolation to produce a smoothed image having dimensions identical to that of the original image.

5. The method of claim 2 wherein generating a smoothed image comprises using at least one of spatial averaging, median, and wavelet-based filters.

6. The method of claim 2 wherein generating a smoothed image comprises performing a combination of resizing and low-pass filtering operations on the original image.

7. The method of claim 6 wherein performing a combination of resizing and low-pass filtering operations on the original image comprises performing first downsampling, then low-pass filtering, and then upsampling.

8. The method of claim 1 wherein generating a sharpened version of the smoothed image comprises applying unsharp masking to the smoothed image.

9. The method of claim 1 wherein generating a sharpened version of the smoothed image comprises applying Laplacian filtering to the smoothed image.

10. The method of claim 1 wherein generating a sharpened version of the smoothed image comprises applying sharpening order-statistic filters to the smoothed image.

11. The method of claim 1 wherein combining the residual image and the sharpened smoothed image to produce a sharpened version of the original image comprises multiplying the residual image and the sharpened smoothed image.

12. The method of claim 1 wherein combining the residual image and the sharpened smoothed image to produce a sharpened version of the original image comprises adding the residual image to the sharpened smoothed image.

13. The method of claim 1 wherein combining the residual image and the sharpened smoothed image to produce a sharpened version of the original image comprises dividing the sharpened smoothed image with the residual image.

14. The method of claim 1 wherein combining the residual image and the sharpened smoothed image to produce a sharpened version of the original image comprises subtracting the residual image from the sharpened smoothed image.

15. The method of claim 1 wherein combining the residual image and the sharpened smoothed image to produce a sharpened smoothed version of the original image comprises multiplying the residual image by a factor prior to combining the residual image and the sharpened smoothed image.

16. The method of claim 15 wherein the factor is less than one.

17. The method of claim 15 wherein the factor is more than one.

* * * * *